US009952689B2

(12) United States Patent
Honji et al.

(10) Patent No.: US 9,952,689 B2
(45) Date of Patent: *Apr. 24, 2018

(54) APPLICATION PROGRAMMING INTERFACE FOR A MULTI-POINTER INDIRECT TOUCH INPUT DEVICE

(71) Applicant: Microsoft Technology Licensing, LLC, Redmond, WA (US)

(72) Inventors: Scott Honji, Sammamish, WA (US);
Paul Millsap, Issaquah, WA (US);
Masahiko Kaneko, Fall City, WA (US);
Eric Hebenstreit, Kirkland, WA (US);
Marc Descamp, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,824

(22) Filed: Jul. 7, 2016

(65) Prior Publication Data
US 2017/0003758 A1    Jan. 5, 2017

Related U.S. Application Data

(63) Continuation of application No. 13/306,989, filed on Nov. 30, 2011, now Pat. No. 9,389,679.

(51) Int. Cl.
*G06F 3/038* (2013.01)
*G06F 3/01* (2006.01)
(Continued)

(52) U.S. Cl.
CPC ............... *G06F 3/038* (2013.01); *G06F 3/01* (2013.01); *G06F 3/041* (2013.01); *G06F 3/0416* (2013.01); *G06F 3/0488* (2013.01)

(58) Field of Classification Search
CPC ........ G06F 3/041; G06F 3/0488; G06F 3/038; G06F 3/01
See application file for complete search history.

(56) References Cited

U.S. PATENT DOCUMENTS 5,616,078 A    4/1997  Oh
6,029,214 A    2/2000  Dorfman et al.
(Continued)

FOREIGN PATENT DOCUMENTS

CA    2318815 A1    7/1999
CN    1661556 A    8/2005
(Continued)

OTHER PUBLICATIONS

"Pointer Ballistics for Windows XP", Retrieved from <<http://web.archive.org/web/20110522061105/http://msdn.microsoft.com/en-us/windows/hardware/gg463319.aspx>>, Oct. 31, 2002, 4 Pages.
(Continued)

*Primary Examiner* — Latanya Bibbins

(57) ABSTRACT

To allow a computer platform to provide a consistent interface for applications to use information from multi-point indirect touch input devices, an application programming interface is provided to a software interface layer that manages interaction of the system with a variety of instantiations of multi-pointer indirect touch input devices. A runtime module provides information from the indirect touch input devices to an input stack accessible by applications on the computer system. The runtime module provides mapping of contacts on the indirect touch input devices to a display.

20 Claims, 8 Drawing Sheets

(51) Int. Cl.
*G06F 3/041* (2006.01)
*G06F 3/0488* (2013.01)

(56) References Cited

U.S. PATENT DOCUMENTS

| | | | |
|---|---|---|---|
| 6,738,045 | B2 | 5/2004 | Hinckley et al. |
| 6,995,748 | B2 | 2/2006 | Gordon et al. |
| 7,310,103 | B2 | 12/2007 | Patton |
| 7,629,961 | B2 | 12/2009 | Casebolt et al. |
| 7,692,627 | B2 | 4/2010 | Wilson |
| 7,757,186 | B2 | 7/2010 | Fabrick et al. |
| 7,774,155 | B2 | 8/2010 | Sato et al. |
| 7,782,309 | B2 | 8/2010 | Janik |
| 7,796,120 | B2 | 9/2010 | Chou |
| 7,855,718 | B2 | 12/2010 | Westerman |
| 8,537,115 | B2 | 9/2013 | Hotelling et al. |
| 2002/0036622 | A1 | 3/2002 | Jaeger |
| 2003/0169277 | A1 | 9/2003 | Patton |
| 2003/0222856 | A1 | 12/2003 | Fedorak et al. |
| 2005/0110769 | A1 | 5/2005 | DaCosta et al. |
| 2006/0033712 | A1* | 2/2006 | Baudisch ............ G06F 3/038 345/157 |
| 2006/0244735 | A1 | 11/2006 | Wilson |
| 2006/0267953 | A1 | 11/2006 | Peterson et al. |
| 2006/0279548 | A1 | 12/2006 | Geaghan |
| 2007/0109275 | A1 | 5/2007 | Chuang |
| 2007/0126743 | A1 | 6/2007 | Park et al. |
| 2007/0229455 | A1 | 10/2007 | Martin et al. |
| 2007/0257891 | A1 | 11/2007 | Esenther et al. |
| 2008/0001923 | A1* | 1/2008 | Hall et al. ................. 345/173 |
| 2008/0001926 | A1* | 1/2008 | XiaoPing ............ G06F 3/03547 345/173 |
| 2008/0024459 | A1 | 1/2008 | Poupyrev et al. |
| 2008/0024505 | A1 | 1/2008 | Gordon et al. |
| 2008/0055256 | A1 | 3/2008 | Kwong et al. |
| 2008/0122798 | A1 | 5/2008 | Koshiyama et al. |
| 2008/0192004 | A1* | 8/2008 | Lapstun ............ G06F 3/03545 345/156 |
| 2008/0259053 | A1 | 10/2008 | Newton |
| 2009/0046110 | A1 | 2/2009 | Sadler et al. |
| 2009/0058829 | A1 | 3/2009 | Kim et al. |
| 2009/0085881 | A1 | 4/2009 | Keam |
| 2009/0122007 | A1 | 5/2009 | Tsuzaki et al. |
| 2009/0128516 | A1* | 5/2009 | Rimon et al. ............... 345/174 |
| 2009/0184939 | A1 | 7/2009 | Wohlstadter et al. |
| 2009/0213084 | A1 | 8/2009 | Kramer et al. |
| 2009/0225049 | A1 | 9/2009 | Liu et al. |
| 2009/0232353 | A1 | 9/2009 | Sundaresan et al. |
| 2009/0256800 | A1 | 10/2009 | Kaufman |
| 2009/0256817 | A1 | 10/2009 | Perlin et al. |
| 2009/0262073 | A1 | 10/2009 | Rigazio et al. |
| 2009/0284479 | A1 | 11/2009 | Dennis et al. |
| 2009/0284495 | A1 | 11/2009 | Geaghan et al. |
| 2010/0020025 | A1 | 1/2010 | Lemort et al. |
| 2010/0079493 | A1 | 4/2010 | Tse et al. |
| 2010/0088652 | A1 | 4/2010 | Ramsay et al. |
| 2010/0097342 | A1 | 4/2010 | Simmons et al. |
| 2010/0103117 | A1 | 4/2010 | Townsend et al. |
| 2010/0110040 | A1 | 5/2010 | Kim et al. |
| 2010/0139990 | A1 | 6/2010 | Westerman et al. |
| 2010/0207892 | A1 | 8/2010 | Lin et al. |
| 2010/0275163 | A1 | 10/2010 | Gillespie et al. |
| 2010/0289754 | A1 | 11/2010 | Sleeman et al. |
| 2010/0309139 | A1 | 12/2010 | Ng |
| 2010/0328227 | A1* | 12/2010 | Matejka et al. ............... 345/173 |
| 2011/0007021 | A1 | 1/2011 | Bernstein et al. |
| 2011/0012835 | A1 | 1/2011 | Hotelling et al. |
| 2011/0022990 | A1* | 1/2011 | Wu .................... G06F 3/04883 715/856 |
| 2011/0025648 | A1 | 2/2011 | Laurent et al. |
| 2011/0032198 | A1 | 2/2011 | Miyazawa et al. |
| 2011/0047504 | A1 | 2/2011 | Wienands et al. |
| 2011/0050394 | A1 | 3/2011 | Zhang et al. |
| 2011/0063248 | A1 | 3/2011 | Yoon |
| 2011/0169748 | A1 | 7/2011 | Tse et al. |
| 2011/0193809 | A1 | 8/2011 | Walley et al. |
| 2011/0205182 | A1 | 8/2011 | Miyazawa et al. |
| 2011/0230238 | A1 | 9/2011 | Aronsson et al. |
| 2011/0248948 | A1 | 10/2011 | Griffin et al. |
| 2012/0050180 | A1 | 3/2012 | King et al. |
| 2012/0105357 | A1 | 5/2012 | Li et al. |
| 2012/0242586 | A1 | 9/2012 | Krishnaswamy et al. |

FOREIGN PATENT DOCUMENTS

| | | |
|---|---|---|
| CN | 101027679 A | 8/2007 |
| CN | 101118469 A | 2/2008 |
| CN | 101211234 A | 7/2008 |
| CN | 101390036 A | 3/2009 |
| CN | 101430624 A | 5/2009 |
| CN | 101526880 A | 9/2009 |
| CN | 100583019 C | 1/2010 |
| CN | 101626522 A | 1/2010 |
| CN | 102197377 A | 9/2011 |
| EP | 2284677 A1 | 2/2011 |
| JP | 3151652 U | 6/2009 |
| KR | 1020100054275 A | 5/2010 |
| KR | 1020110076292 A | 7/2011 |
| WO | 9938149 A1 | 7/1999 |
| WO | 2006020305 A2 | 2/2006 |
| WO | 2011049513 A1 | 4/2011 |
| WO | 2011082477 A1 | 7/2011 |

OTHER PUBLICATIONS

"Windows Mouse Things", Retrieved from <<http://donewmouseaccel.blogspot.in/2009/06/out-of-sync-and-upside-down-windows.html>>, Jun. 14, 2009, 7 Pages.
"YHTK—Feature Rich Universal Touchscreen Controller", Retrieved from <<http://www.flightsim.com/vbfs/showthread.php?225255-YHTK-feature-rich-universal-touchscreen-controller>>, Jan. 13, 2011, 2 Pages.
"Supplementary Search Report Issued in European Patent Application No. 12840912.5", dated Jul. 14, 2015, 11 Pages.
"Supplementary Search Report Issued in European Patent Application No. 12842912.3", dated Jun. 18, 2015, 6 Pages.
"Supplementary Search Report Issued in European Patent Application No. 12853539.0", dated Mar. 27, 2015, 6 Pages.
"Final Office Action Issued in U.S. Appl. No. 13/277,220", dated Jun. 25, 2014, 24 Pages.
"Non Final Office Action Issued in U.S. Appl. No. 13/277,220", dated Feb. 9, 2015, 23 Pages.
"Non Final Office Action Issued in U.S. Appl. No. 13/277,220", dated Feb. 5, 2014, 24 Pages.
"Final Office Action Issued in U.S. Appl. No. 13/277,222", dated Nov. 29, 2013, 17 Pages.
"Final Office Action Issued in U.S. Appl. No. 13/277,222", dated Dec. 29, 2014, 25 Pages.
"Non Final Office Action Issued in U.S. Appl. No. 13/277,222", dated Aug. 5, 2014, 23 Pages.
"Non Final Office Action Issued in U.S. Appl. No. 13/277,222", dated Jul. 23, 2013, 18 Pages.
"Notice of Allowance Issued in U.S. Appl. No. 13/277,222", dated Jun. 30, 2015, 7 Pages.
"Non Final Office Action Issued in U.S. Appl. No. 13/280,346", dated Feb. 19, 2014, 20 Pages.
"Notice of Allowance Issued in U.S. Appl. No. 13/280,346", dated Jul. 7, 2014, 10 Pages.
"Notice of Allowance Issued in U.S. Appl. No. 13/280,346", dated Nov. 13, 2014, 7 Pages.
"Final Office Action Issued in U.S. Appl. No. 13/306,989", dated Nov. 19, 2015, 13 Pages.
"Final Office Action Issued in U.S. Appl. No. 13/306,989", dated Sep. 2, 2014, 13 Pages.
"Non Final Office Action Issued in U.S. Appl. No. 13/306,989", dated Feb. 18, 2015, 12 Pages.
"Non Final Office Action Issued in U.S. Appl. No. 13/306,989", dated Dec. 13, 2013, 13 Pages.

(56) References Cited

OTHER PUBLICATIONS

"Notice of Allowance Issued in U.S. Appl. No. 13/306,989", dated Mar. 11, 2016, 5 Pages.
"First Office Action and Search Report Issued in Chinese Patent Application No. 201210399507.X", dated Jan. 5, 2015, 14 Pages.
"Notice of Allowance Issued in Chinese Patent Application No. 201210399507.X", dated Jun. 23, 2016, 4 Pages.
"Second Office Action Issued in Chinese Patent Application No. 201210399507.X", dated Aug. 17, 2015, 6 Pages.
"Third Office Action Issued in Chinese Patent Application No. 201210399507.X", dated Feb. 26, 2016, 6 Pages.
"First Office Action and Search Report Issued in Chinese Patent Application No. 201210399628.4", dated Dec. 3, 2014, 12 Pages.
"Notice of Allowance Issued in Chinese Patent Application No. 201210399628.4", dated Jul. 30, 2015, 3 Pages.
"First Office Action and Search Report Issued in Chinese Patent Application No. 201210411852.0", dated Dec. 3, 2014, 15 Pages.
"First Office Action and Search Report Issued in Chinese Patent Application No. 201210501550.2", dated Feb. 2, 2015, 14 Pages.
"Notice of Allowance Issued in Chinese Patent Application No. 201210501550.2", dated Apr. 6, 2016, 4 Pages.
"Second Office Action Issued in Chinese Patent Application No. 201210501550.2", dated Oct. 19, 2015, 10 Pages.
Benko, et al., "Pointer Warping in Heterogeneous Multi-Monitor Environments", In Proceedings of Graphics Interface Conference, May 28, 2007, pp. 111-117.
Fragiacomo, et al., "Novel Designs for Application Specific MEMS Pressure Sensors", In Journal-Sensors, vol. 10, Issue 11, Oct. 28, 2010, pp. 9541-9563.
Geiger, Gunter, "Using the Touch Screen as a Controller for Portable Computer Music Instruments", In Proceedings of the Conference on New Interfaces for Musical Expression, Jun. 4, 2006, pp. 61-64.
Hutterer, et al., "Windowing System Support for Single Display Groupware", In Proceedings of Computer Supported Cooperative work, Nov. 4, 2006, 2 Pages.
McCallum, et al., "ARC-Pad: Absolute+Relative Cursor Positioning for Large Displays with a Mobile Touchscreen", In Proceedings of the 22nd Annual ACM symposium on User interface software and technology, Oct. 4, 2009, pp. 153-156.
Moscovich, et al., "Multi-Finger Cursor Techniques", In Proceedings of Graphics Interface, Jun. 7, 2006, 7 Pages.
"International Preliminary Report on Patentability Issued in PCT Application No. PCT/US2012/061225", dated Apr. 22, 2014, 4 Pages.
"International Search Report & Written Opinion Issued in PCT Application No. PCT/US2012/061225", dated Feb. 7, 2013, 16 Pages.
"International Preliminary Report on Patentability Issued in PCT Application No. PCT/US2012/061742", dated Apr. 29, 2014, 5 Pages.
"International Search Report & Written Opinion Issued in PCT Application No. PCT/US2012/061742", dated Feb. 20, 2013, 9 Pages.
"International Preliminary Report on Patentability Issued in PCT Application No. PCT/US2012/066564", dated Jun. 3, 2014, 6 Pages.
"International Search Report & Written Opinion Issued in PCT Application No. PCT/US2012/066564", dated Feb. 15, 2013, 9 Pages.
Wu, et al., "Visual Panel: From an Ordinary Paper to a Wireless and Mobile Input Device", In Technical Report MSR-TR-2000-112, Oct. 1, 2000, 14 Pages.

* cited by examiner

APPLICATION PROGRAMMING INTERFACE FOR A MULTI-POINTER INDIRECT TOUCH INPUT DEVICE

CROSS REFERENCE TO RELATED APPLICATIONS

This application is a continuation of U.S. patent application Ser. No. 13/306,989, entitled "Application Programming Interface for a Multi-pointer Indirect Touch Input Device", filed Nov. 30, 2011, pending, which is hereby incorporated by reference.

BACKGROUND

Manual input devices used for navigation and spatial control of a computing system have a significant impact on capabilities of the computer system and a user's overall experience. There are several kinds of manual input devices. The most common of these for personal computers include single-pointer, indirect interaction devices, such as a mouse or trackpad, and direct interaction devices, such as touchscreens.

A single-pointer, indirect interaction device sensor detects user interaction with the sensor and maps this interaction to a position on a display. One method of mapping points of input to the display involves one-to-one mapping of sensor extents to the extents of the display, which is called absolute mapping. Examples of devices that employ absolute mapping are pen and touch digitizers. Another method involves mapping device sensor coordinates to a movable subportion of the display, which is called relative mapping.

Examples of devices that employ relative mapping are the mouse and devices that emulate the mouse, such as a trackpad. A mouse senses movement, which displaces a presumed starting position by a distance based on the sensed interaction with the device. A trackpad is commonly used in a manner similar to a mouse. The motion of a contact on the trackpad is sensed, and the sensed motion is treated in a manner similar to a mouse input.

A direct interaction device allows interaction with a device that is visually aligned with a display. A direct interaction device maps between positions on a touch sensitive surface and positions on a display of the same size, using an absolute mapping. For example, when a user touches a point on a touchscreen, an input event may trigger an application response, such as command actuation, in the user interface at a position corresponding to the point on the display touched by the user.

Absolute and relative mapping of spatial input from a multi-pointer input device to a display have selective advantages and disadvantages, depending on physical attributes of the input and display devices, the capabilities of the system, the nature and layout of the application user interface, the type of the task the user is performing, and various ergonomic factors.

Most input devices have buttons in addition to their position information. For example, dual-state mechanical buttons are common on mice. Pen digitizers also typically have some pressure-responsive device in the tip. Most software drivers for pen digitizers implement a form of mouse emulation in process tip-related data. Also, buttons and other mechanisms generally are processed as independent inputs of the input device.

Input devices can be made in variety of shapes and sizes, can have different resolutions from each other, and can provide a variety of data as input to the computer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To allow a computer platform to provide a consistent interface for applications to use information from multi-point indirect touch input devices, an application programming interface is provided to a software interface layer that manages interaction of the system with a variety of instantiations of multi-pointer indirect touch input devices.

Such a host service can provide capabilities such as discovery and binding of touch controller class devices upon physical attachment to the host system; software driver and hardware-only interfaces for communicating device capabilities, touch data, and device mode changes between the controller and the host system; transformation of stateless input events emitted by touch controllers into one or more user or application-selectable touch interaction models; global management of touch controller device, device connection, and user interaction state; enforcement of base system requirements for touch device controllers; common interface for user device configuration settings; support for device-specific, value-add interaction models; management of host and device security contexts; deployment and servicing model for the touch controller host.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which an indirect touch input device can be used. After describing an example implementation of the use of a multi-pointer indirect touch device in connection with FIGS. 1-6, an example software architecture will then be described in connection with FIGS. 7 and 8.

Figure 1:
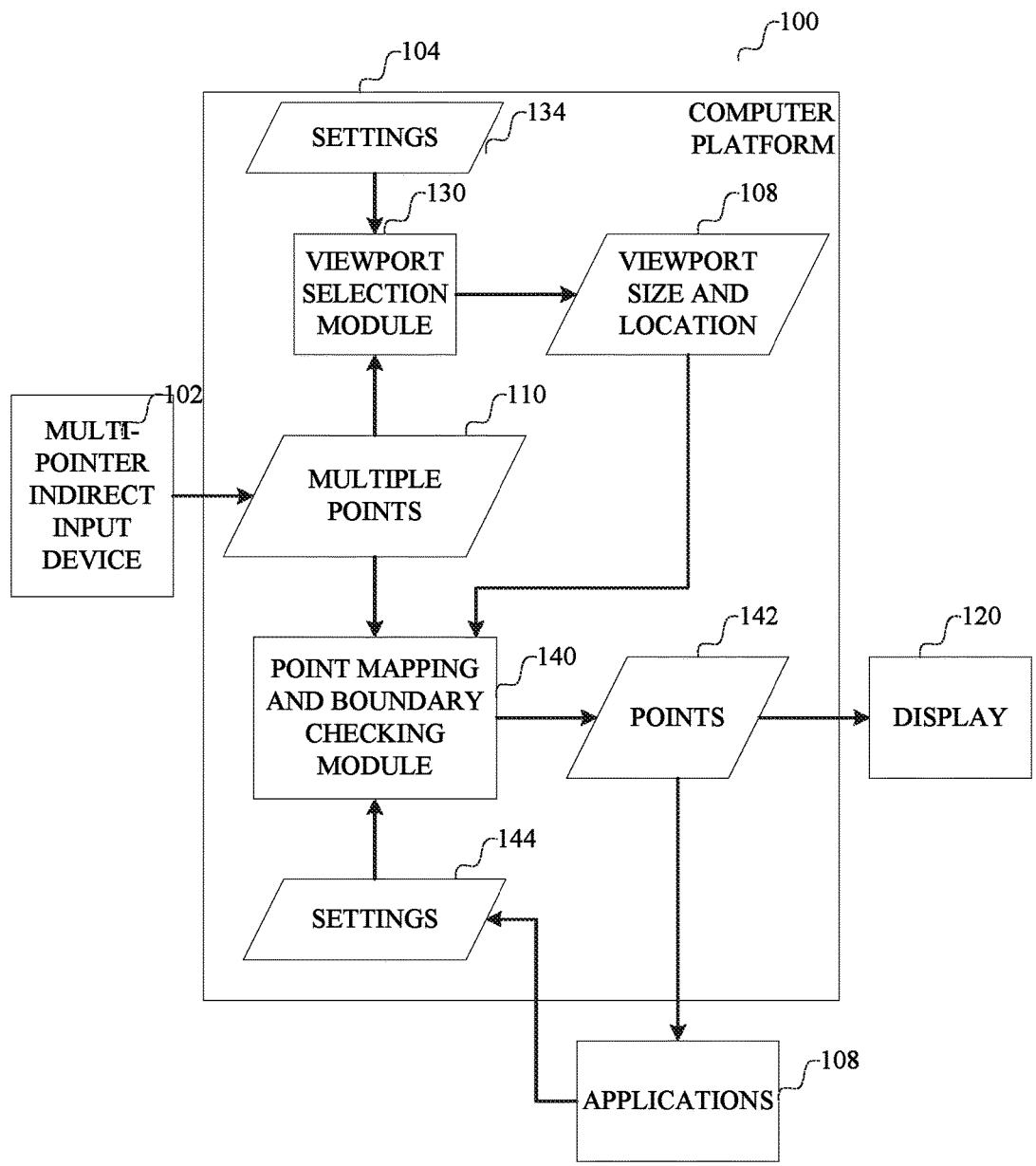
FIG. 1 is a block diagram of an example system using an multi-pointer indirect touch device.

Referring to FIG. 1, a computer system 100 includes a multi-pointer, indirect input device 102, having a sensor, connected to a computer platform 104 (details of an example of which are described below). Such a computer system may be a personal computer, home entertainment system, a projector, a kiosk application, compact personal electronics, or the like. The computer platform has an operating system which manages interaction between one or more applications 108 and resources of the computer platform 104, such as its peripheral devices including the multipointer indirect input device.

Within the operating system, data describing multiple sensed input points 110 is received from the sensor of the multipointer indirect input device 102. These input points are processed to map them to points on a display 120.

This mapping process involves determine an initial mapping of the device coordinate system to the display coordinate system, which can be relative or absolute, and then a mapping of each point from the device coordinate system to the display coordinate system. Such initial mapping occurs at the beginning of each input session.

An input session is from a point in time a first input is detected by the sensor to a point in time a last input is removed from the sensor. During an input session, the input points are likely to move. The input points are mapped to from their new locations in the sensor coordinate system to corresponding new locations in the display coordinate system. This movement mapping can take into consideration issues such as bounding and acceleration.

As shown in FIG. 1, the multiple points 110 are input to a viewport selection module 130 at the beginning of an input session. The viewport selection module provides, as its output, a viewport size and location 132 in the display coordinate system. The viewport defines a region in the display coordinate space to which the sensor coordinate space is mapped. In a configuration in which multiple device sensors are connected to the system, each sensor has its own viewport. The viewport may have a shape that corresponds to the shape of the input device sensor. In some implementations however, the viewport may have a different aspect ratio or orientation from the sensor, or even a different shape. For example, an ellipsoid sensor may be mapped to a rectangular viewport. The viewport's shape is typically defined by the host system, but may also be defined by the device or the user. The viewport's size and position are computed when user inputs are detected by the sensor. When no user inputs are detected by the sensor, the size and position of the viewport are undefined. The viewport is typically not displayed to the user. Together, the viewport's shape, size and position represent the mapping of the sensor coordinate system to the display coordinate system. Settings 134 determine how this mapping is done, such as by relative or absolute mapping, examples of which are described in more detail below.

The multiple points 110 also are input to an input mapping module 140 throughout an input session. The input mapping module provides, as its output, multiple points 142 in the display coordinate system. Settings 134 determine how each point is mapped, such as by determining device and display reference locations for interpreting relative input positions, applying input motion acceleration, span adjustments, and bounding conditions, examples of which are described in more detail below.

Given the multiple points mapped to a display coordinate system, the multiple points 142 can be displayed on the display. Each point can be treated by the operating system 106 and/or applications 108 in a manner similar to any single point, e.g., for selection of a displayed item, or in a manner similar to multiple points from direct touch input sensors, e.g., effecting zoom, rotation or movement of an element in the host system user interface. The range of possible uses of the multiple points, once mapped to the display, is not limiting of this invention.

Given this context, an example implementation of the mapping of multiple points to a display will now be described in more detail in connection with FIGS. 2-4.

Figure 2:
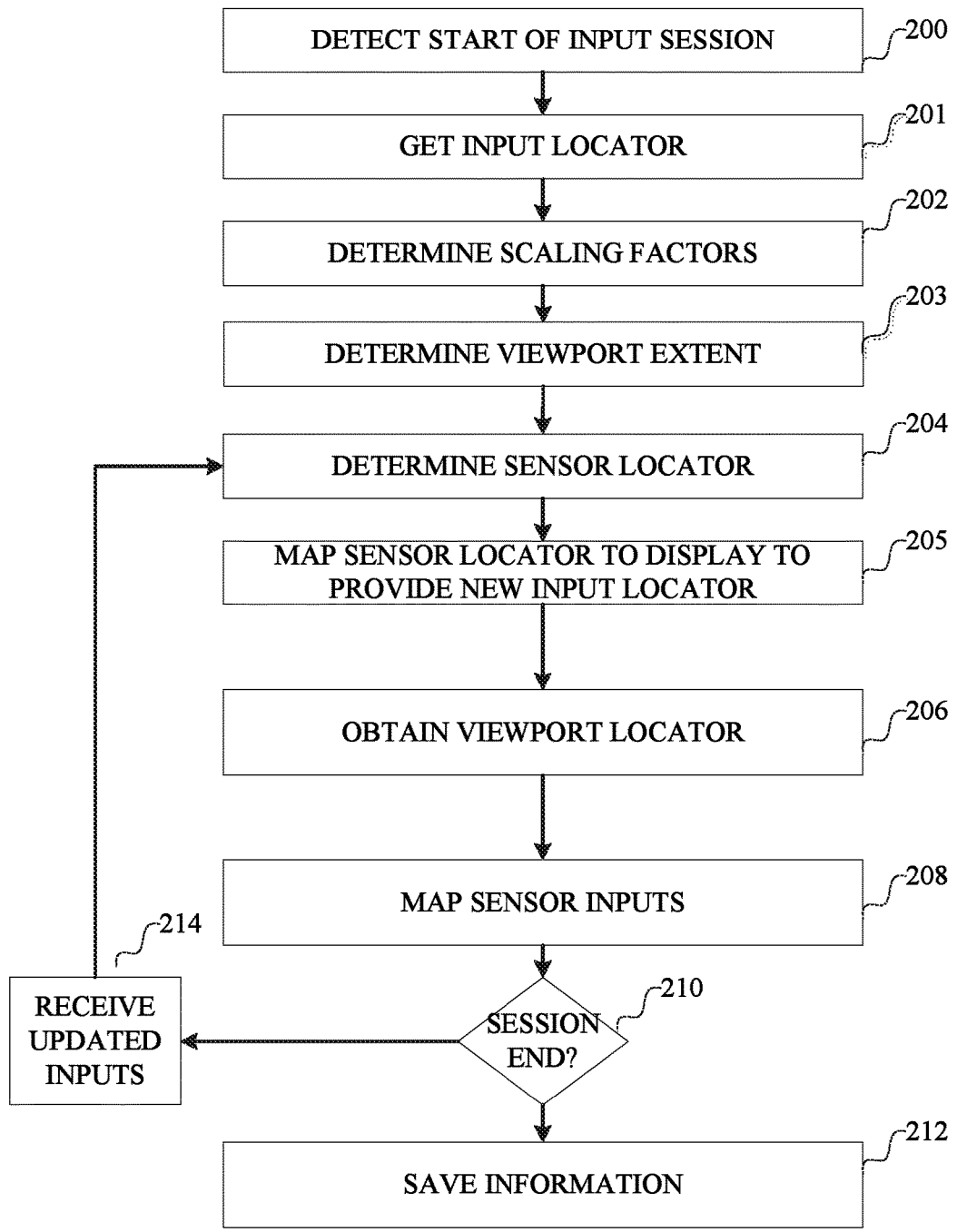
FIG. 2 is a flow chart illustrating an example implementation of viewport placement.

In FIG. 2, a flowchart describes an example implementation of how the viewport size and location can be selected by the viewport selection module, and how points can be subsequently mapped.

It should be noted that the following implementation is based upon certain design decisions about a desirable user experience. For example, it is assumed that the relative position of each physical input with respect to other physical inputs is retained upon projection to the display. It is also assumed that distances between all inputs are scaled symmetrically.

Another aspect of the user experience is the kind of mapping between the input device and the display. The mapping can be relative or absolute, and can be independent for each axis. For example, a relative mapping can be applied to the y axis, with an absolute mapping applied to the x axis, or vice versa. Also, both axes can use different relative mappings. The mapping also can be based on logical coordinates or physical dimensions of the input device and the display. If the mapping is based on the physical dimensions of the devices, spatial accuracy is improved, providing a more intuitive and cognitively efficient interface. These decisions about the kind of mapping can be optional settings in the system.

Another aspect of the user experience is a bounding policy. In particular, device inputs can be subject to a display bounding policy for the system. For example, all device inputs can be forced to remain within the display, or only one device input from the set can be forced to remain within the display. Another implementation does not use any bounding policy. These decisions about bounding policy can be optional settings in the system.

The viewport size and location is determined at the beginning of each input session. The start of an input session is detected 200, for example, when one or more input points are detected by the sensor after a period of no user input. The viewport dimensions in each axis may defined by the input device, the host system, or the user. The dimensions can be expressed as either a percentage of the target display device or in physical units of distance. For physical units of distance to be used, the physical and logical (coordinate) extents of both the input sensor and display are provided, by, for example, the device, user input or other means. A position of an output locator, in the display coordinate space, is then retrieved 201. In this implementation, the output locator position is global to the user session (which begins when a user logs in and ends when the user logs off). The output locator position is shared among and updated by multiple single- and multi-pointer input devices connected to the system. The output locator can be a position saved from a previous input session. If there was no previous input session, then the center of the display device, the last position of a mouse or other device, or an alternative default display location can be used as the output locator position.

Next, given known parameters, i.e., coordinates and bounds, of the display device and input device, scaling factors for each axis are determined 202. These parameters typically are stored in memory. In the case of display device, parameters can be retrieved using system API's. In the case of the input device, parameters can be retrieved via device interrogation. Given the coordinates and bounds of the display and input devices, the scaling factors are determined. If an absolute mapping is used, computations based on physical extents are not necessary, and the x and y axis scale factors are based on a one-to-one ratio of the device and display coordinate extents. If a relative mapping is used, then the x and y axis scale factors are determined by the ratios of the device dimensions to the viewport dimensions in display coordinates. The scale factors can be computed once, stored in memory and retrieved when needed.

The viewport extent, i.e., x and y coordinates of its vertices, in the display coordinate space is determined 203 using the determined scale factors. The viewport extent is initially determined for an input session using the saved output locator, before a new output locator is computed as follows.

For a scaled viewport using the pixel density of the display, the scale factors SV are non-zero, positive values between 0 and 1, and the extent of the viewport $R_v = \{[L_{V0x} - S_{Vx}/[2*\text{extent}(R_{Dx})], L_{V0x} + S_{Vx}/[2*\text{extent}(R_{Dx})], L_{V0y} - S_{Vy}/[2*\text{extent}(R_{Dy})], L_{V0y} + S_{Vy}/[2*\text{extent}(R_{Dy})]\}$, where $L_{V0}$ is an initial viewport locator, typically the center of the target display, $S_V$ are the scale factors and extent $(R_D)$ are the x and y coordinate extents of the display, i.e., its pixel width and height, and subscripts x and y indicate those values on the x and y axes.

For a viewport using physical dimensions, where the desired size $S_V$ is a non-zero, positive value no greater than the physical extent of the target display, and the pixel density D of the display is known via hardware interrogation, the extent of the viewport $R_v = \{[L_{V0x} - S_{Vx}/[2*\text{extent}(R_{Dx})]]*D_x + R_{Dx.left}, [L_{V0x} + S_{Vx}/[2*\text{extent}(R_{Dx})]]*D_x + R_{Dx.left}, [L_{V0y} - S_{Vy}/[2*\text{extent}(R_{Dy})]]*D_y + R_{Dy.top}, [L_{V0y} + S_{Vy}/[2*\text{extent}(R_{Dy})]]*D_y + R_{Dy.top}\}$, Given an initial extent of the viewport, a sensor locator is then determined 204, initially in the device coordinate system. There are many ways to select the sensor locator, and the particular way chosen is dependent on the desired user interaction. For example, if there is a single input detected by the sensor, the sensor locator can be the coordinates of this single input. If there are multiple inputs, then the sensor locator can be the position of a single "primary" input, or a point having a particular relationship with other inputs, such as the geometric center of all inputs. The sensor locator is undefined when no input points are detected and is not persisted between input sessions.

When the position of a primary input is used as the sensor locator, one of a variety of methods can be used to select and assign primary status to the input. In general, the "primary" input is an input point chosen from among the others by any method. For example, the primary input can be the first input, or the last input, detected in the session. This method carries the drawback of forcing an arbitrary selection in the case of multiple inputs arriving simultaneously. A solution is for the primary input to selected by a form of geometric ordering, such as the highest order input according to a geometric sorting formula (which can be interaction dependent). For example, a sorting formula can sort angles formed by each input point with respect to an origin at the geometric center of all inputs and a reference point. The reference point can be, for example, a vertical line with angle measured based on left or right handedness of a user.

Regardless of method, sensor locator determination may be affected by the time of arrival and departure of inputs. To protect against the condition in which the user intends to arrive or depart multiple inputs simultaneously but instead arrives or departs them at slightly different times, a small time window (e.g., 10-60 ms) can be used to delay sensor locator calculation.

Next, the sensor locator position is mapped 205 from device coordinates to display coordinates. The result is a new output locator position for the frame. This position can be computed by $[L_S/\text{extent}(R_S)*\text{extent}(R_V)] + R_{V0}$, where $L_S$ is the x or y coordinate of the sensor locator, $\text{extent}(R_S)$ is the width or height of the sensor coordinate space, and extent $(R_V)$ is the width or height of the viewport, and $R_{V0}$ is the width or height of the initial viewport. This new output locator is constrained to be within the bounds of the display.

Given the new output locator, the viewport is then positioned in the display coordinate space by obtaining 206 the viewport locator. For the first frame of the session, the viewport position is determined; in subsequent frames it is retrieved from memory. The position of the viewport is determined logically, meaning that it is optional whether to display the viewport. In fact, in most implementations it is likely to be preferable not to actually display the viewport.

As noted above, the viewport is a projection of the input sensor coordinate space on the display, and the viewport locator position is the geometric center of the viewport, in display coordinates. As also noted above, unlike the output locator, the viewport is undefined when no inputs are detected by the sensor. It is associated with a particular device instance (rather than global to the user session), and its position is updated when the user initially places inputs on the sensor. After an input session starts, and until the input session ends, the viewport remains stationary between frames. If a frame represents a continuance of an input session (lists of input points from both previous and current frames are not empty), then the viewport locator is retrieved from memory. If the frame initiates a new input session, then the viewport locator is obtained by determining an offset between a sensor locator (determined in step 205) and the output locator position (determined in step 201), as follows.

$$\Delta L_D = L_D - L_{D0}$$

$$L_V = [L_S/\text{extent}(R_S)*\text{extent}(R_V)] + L_{V0} + \Delta L_D$$

$L_V$ is then constrained to the bounds of the target display and the extent of the viewport, determined above, is recalculated using the new viewport locator.

After computing the sensor locator, viewport locator, and output locator for a frame, the sensor inputs for that frame are then mapped 208 to display coordinates, in a manner described in more detail below. If the input session ends, as determined at 210, then some information about the input session can be saved 212 (such as the last output locator). If the input session has not ended, and if updated sensor input positions are received (as determined at 214), then the process repeats with determining the sensor locator 204 for the frame, through mapping 208 these new sensor inputs to the display. However, where the frame is part of a continuing session, the viewport locator is not determined in step 206, but is retrieved from memory.

Figure 3:
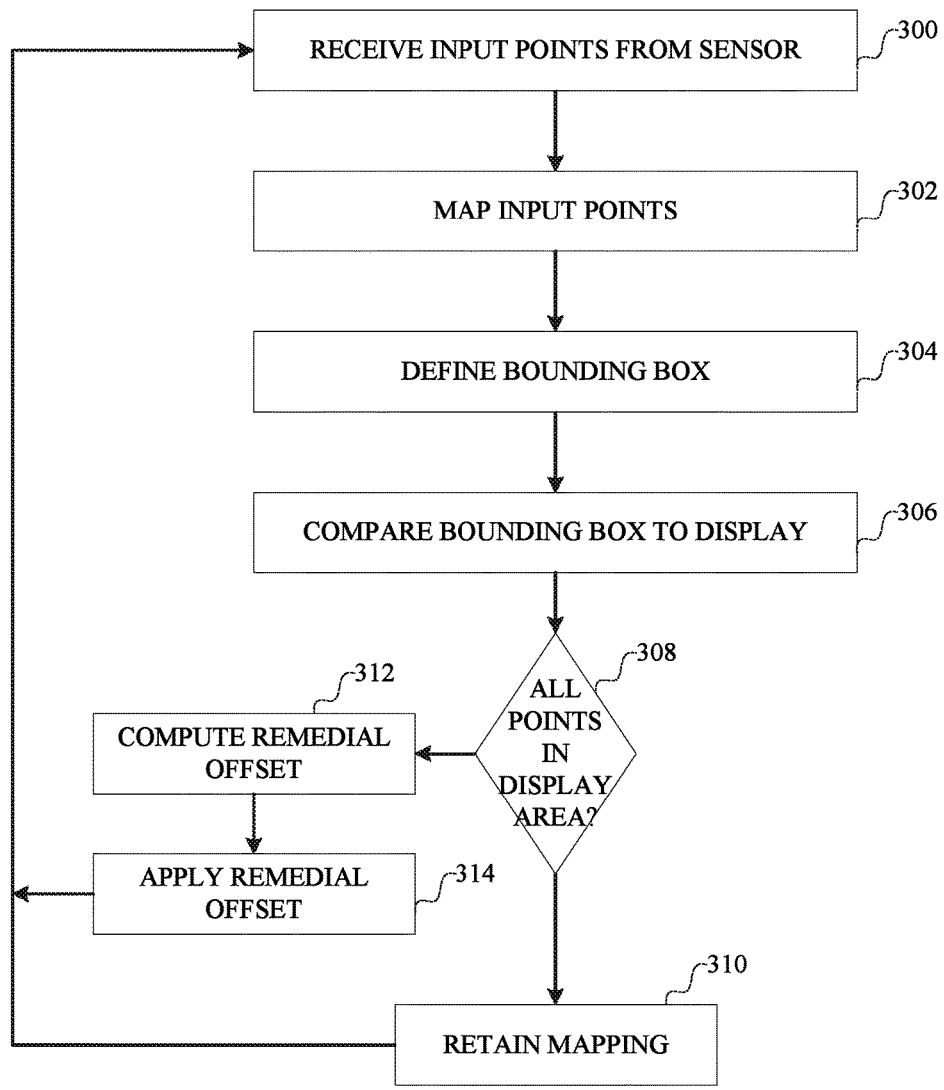
FIG. 3 is a flow chart illustrating an example implementation of contact mapping.
Figure 4:
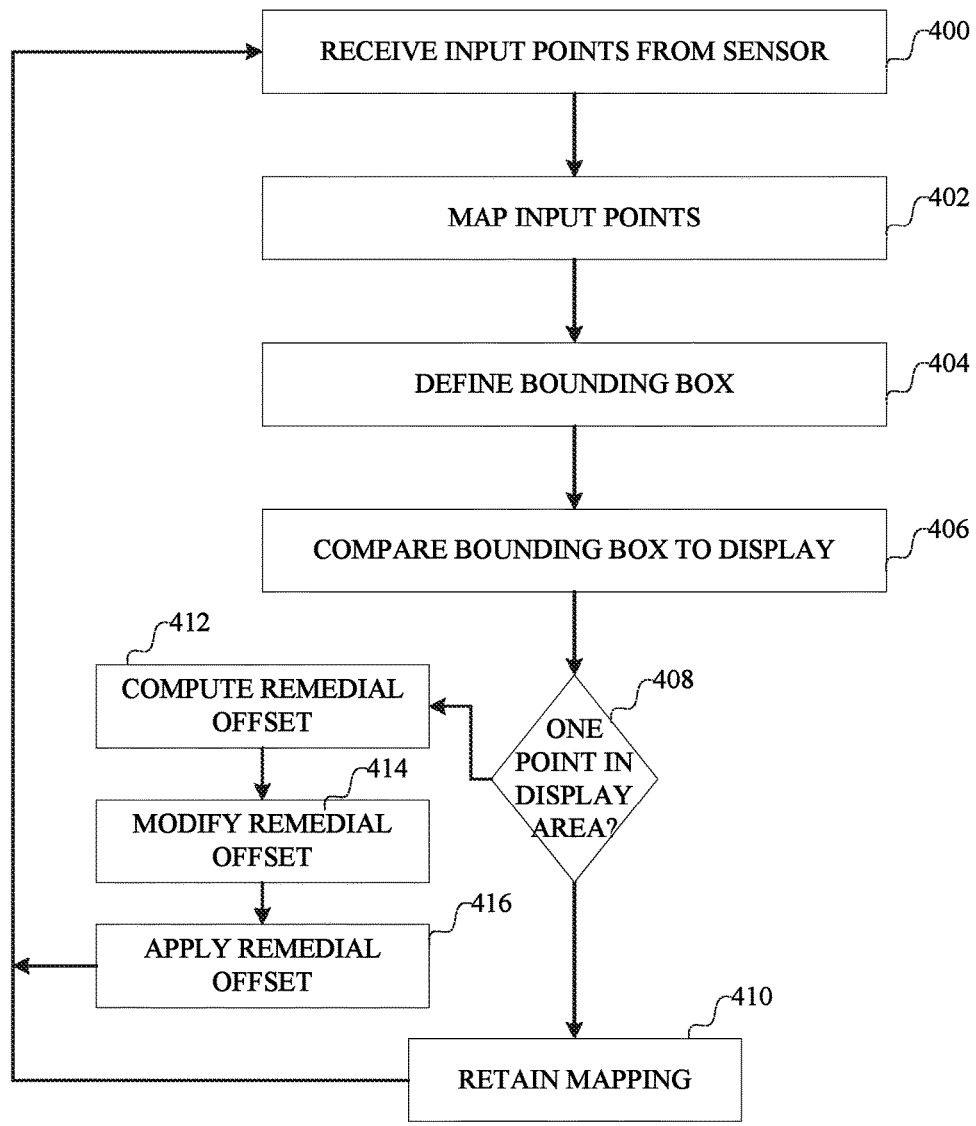
FIG. 4 is a flow chart illustrating another example implementation of contact mapping.
Figure 5:
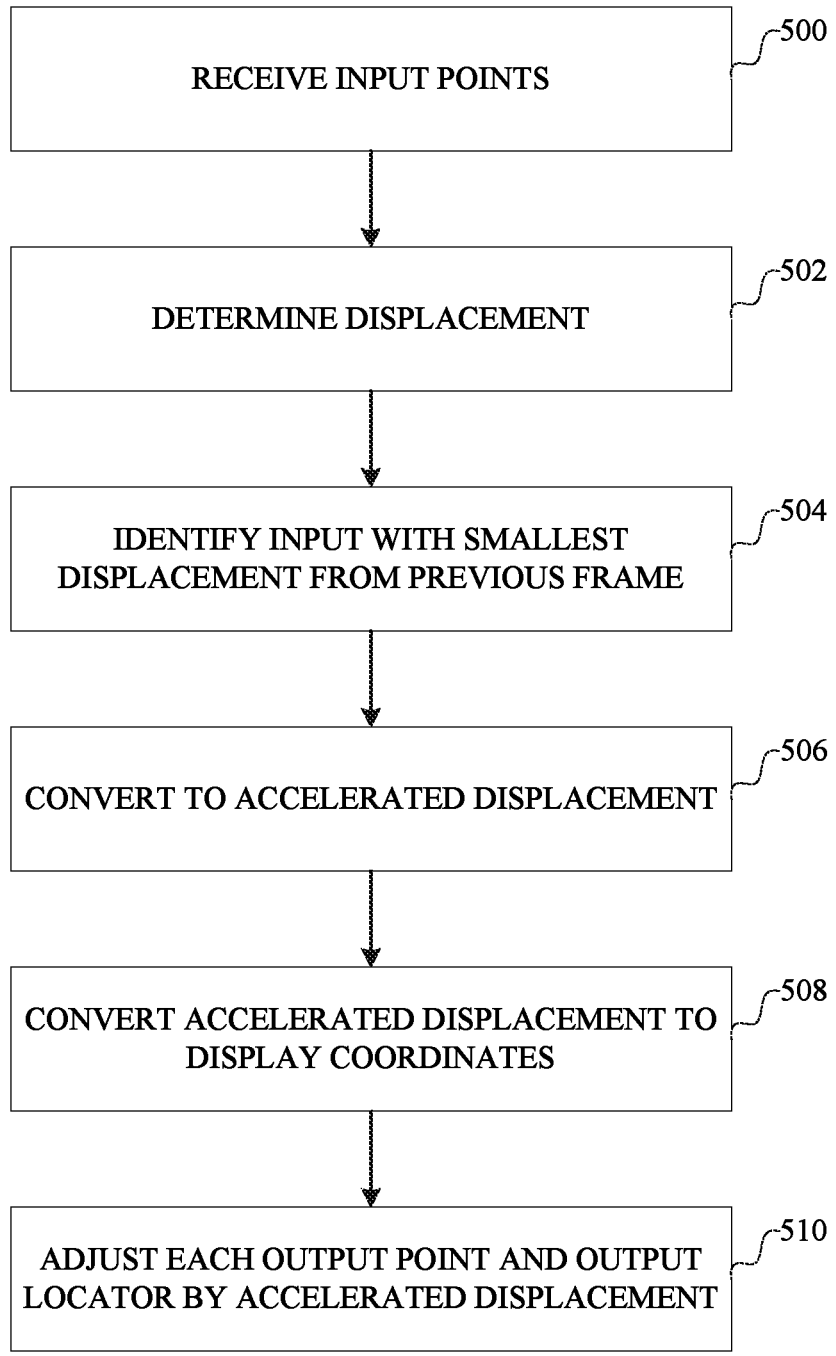
FIG. 5 is a flow chart illustrating an example implementation of contact acceleration.

FIG. 3 describes how, given the viewport size and location, sensor inputs are mapped to points in the viewport, including the enforcement of boundary conditions (if relative mapping is done) on a single display. FIG. 3 describes a case in which all inputs are constrained to being within the display.

The system receives 300 a list of input points from the device, each having coordinates in the device coordinate space. Next, the input points are mapped 302 to their corresponding points in display coordinate space. For example, the coordinates $C_D$ in display coordinate space of a point $C_S$ in device coordinate space can be computed by $[C_S/\text{extent }(R_S)]*\text{extent }(R_V)]+R_V$.

A bounding box containing the input points is defined 304. The corners of the bounding box are mapped to and compared 306 to the visual extent of the display. If none of the corners of the bounding box is outside of the visual area of the display, then the input mapping is retained 310. Otherwise, an offset to move the bounding box to be within the visual extent of the display is determined 312. In computing the minimal remedial offset, a displacement vector between previous and current frames of each non-conforming corner of the input bounding box or the individual input define a path and its point of intersection with the visible display boundary. The remedial offset is the displacement between the path's origin and the point of intersection. This offset is applied 314 to the points to re-map them to new positions within the visual area of the display.

In another implementation, the points are constrained so that at least one input point from the device remains displayed. In FIG. 4, the system receives 400 a list of input points from the device, each having coordinates in the device coordinate space. Next, the input points are mapped 402 to their corresponding points in display coordinate space. A bounding box containing the input points is defined 404. The corners of the bounding box are then compared 406 to the visual extent of the display. If at least one of the corners of the bounding box remains in the visual area of the display, then the input mapping is retained 410. Otherwise, a remedial offset to move at least one point of the bounding box to be within the visual extent of the display is determined 412. Next, an offset of the input nearest the contained corner is determined and applied 414 to remedial offset. This updated remedial offset is applied 416 to the points to re-map them to new positions within the visual area of the display.

For multiple monitor displays, the process is similar. There are regular display topologies, where the union of visible areas of the display is a single, rectangular, "virtual" display with no internal voids. For regular display topologies, bounding of multiple inputs to the boundaries of the virtual display surface is identical to that for a single display. There also can be irregular display topologies, where the union of visible areas of the display is a rectilinear virtual display with convex or concave internal voids. For these display topologies, the foregoing methods can be used to compute and apply remedial offsets.

However, an additional failure case is where a point lies in one of the convex or concave internal voids, a bounding box containing only those points outside of the visual area of the display can be computed, and used to compute a remedial offset. In this case, a bounding box is computed to contain input points that do not map to visible areas of the display, herein called a non-conforming bounding box. A minimal remedial offset is computed by which to ensure at least one corner of a non-conforming bounding box is contained within the visible portion of the display. This remedial offset is applied to the device-to-display transform for all inputs.

A more specific example implementation of boundary conditions for multiple monitors will now be described.

In this example, for each input, a target bounding display ($R_{D,\ target}$) is determined in the following way. First, it is determined if the input position $C_D$ is not contained within a visible region of the virtual display surface. If it is not, then the coordinates of display $R_{D0}$ of the input for the previous frame are retrieved. For a frame representing a new session, these coordinates are substituted with those of the display containing the output locator position $L_D$. Next, it is determined whether the input $C_D$ remains bounded by $R_{D0}$ in either the x or y axis. If a positive test is observed in either axis, then the target bounding display is the display $R_{D0}$. Otherwise, the input is out of the bounds of display $R_{D0}$. A displacement vector $\Delta S_S$ in sensor coordinates is then determined for this input: $\Delta S_S = C_S - C_{S0}$. The extent of the sensor, extent($R_S$), is retrieved. The dominant axis of displacement is determined. The X axis dominates if $|\Delta S_{Sx}/\text{extent}(R_{Sx})| >= |\Delta S_{Sy}/\text{extent}(R_{Sy})|$. Otherwise the Y axis dominates.

The dominant axis of input displacement is then used to determine a target bounding display. If the X axis is dominant, then the target bounding display $R_{D,\ target}$ is the display that satisfies the following conditions: 1. the input falls in the horizontal range of the display; 2. the target display is in the primary moving direction of the input and shares that boundary with the last display; and 3. the last input position falls into the vertical range of the display. If the Y axis is dominant, then the target bounding display $R_{D,\ target}$ satisfies the following conditions: 1. the input falls in the vertical range of the display; 2. the target display is in the primary moving direction of the input and shares that boundary with the last display; and 3. the last input position falls into the horizontal range of the display.

If the target bounding display cannot be determined using the dominant direction, then a search is performed in the non-dominant direction. If the target bounding display is still not found, the target display is the input's previous display.

Given the target bounding display for an input, the input is clamped to that display, and the clamping offset is calculated and stored. This clamping offset is applied to all inputs so that the relative distance among them is maintained. After adjusting the inputs in this manner, they are all tested again to ensure they are on the visible part of the display.

In some interaction modes, a small amount of time is allowed to realize the user's intention to make multiple inputs with the sensor simultaneously. When the first input of a session is observed, a timer is activated and arriving inputs are marked inactive, and sensor locator determination is deferred until timer expiration, or terminated if arriving inputs are removed. Likewise, the user may intend to depart inputs simultaneously. To realize this intention without affecting sensor locator position, a timer can be used. The timer is activated, and departing inputs continue to be included in sensor locator computations until the timer expires.

In the foregoing description, in both relative and absolute mapping modes, the input points are mapped directly to display coordinates. In a relative mapping mode, however, the input device can span only a subset of the target display coordinate space. Therefore, navigation from one display location to another location can involve multiple strokes, unless some form of acceleration of the points is applied as movement of the input points is detected. Conversely, in order to achieve pixel-level, point-to-point targeting precision, a form of deceleration of the points can be applied. Such acceleration and deceleration, sometimes referred to as "pointer ballistics," can be applied to a multiple input, indirect input device in the following manner. The displacement of input points on the input device is taken into consideration in the mapping of the input points from the device coordinate space to the display coordinate space, to accelerate or decelerate, as the case may be, movement of the points on the display. In general, a measure of displacement for the input points is determined. This displacement is the input to a function that determines, based on the displacement, how to alter the mapping of the input device points to their corresponding display coordinates.

In one implementation, the displacement of each input point is determined. The physical displacement in sensor pixels of the input with the lowest magnitude displacement vector is passed through an acceleration curve transform to produce a single accelerated display displacement, and this is applied to the display displacements of the output locator and all points. The inputs to the acceleration function can be either the vector magnitude or a value for each axis can be input to two different acceleration functions. This implementation will now be described in connection with FIG. 5.

First, input points on an input sensor, from first and second points in time, are received 500. Note that how to uniquely identify and track moving or stationary inputs, known in the art as "input recognition and tracking," is device and sensor specific. The invention is not limited to any specific input recognition and tracking technique. Any technique for such recognition and tracking that has been found to be suitable in the art can be used.

The displacement in device coordinates (i.e., pixels) in each dimension of each input within a time interval is then determined 502. If the time intervals are known to be constant, then the displacement alone can be used. Otherwise the time interval can be used to compute velocity.

For each time interval, or "frame," of inputs, the input with the smallest magnitude displacement, or velocity, is identified 504. The input with the lowest magnitude is chosen (rather than the average or maximum, for example) so that inputs held stationary on the input sensor remain stationary when mapped to the display.

The displacement of the identified input can be converted from a displacement in pixels to a physical displacement, using the pixel density of the sensor. The displacement value is used as an input to an acceleration function to transform 506 the value to an accelerated displacement. The invention is not limited by the specific acceleration formula used. Any reasonable technique currently used in the art, such as used for mouse pointer acceleration, can be used. The invention generally can be applied to any acceleration formula that permits independent acceleration of each coordinate axis (x, y or z). A suitable transform can be implemented using a piece-wise linear function that maps a displacement value to an accelerated displacement value. The accelerated displacement value, if based on physical dimensions can be converted back to pixel coordinates.

The accelerated displacement is then converted 508 to an accelerated displacement in display coordinate space. For example, the conversion can be expressed by the following: $\Delta C_D = \Delta C_S / \text{extent}(R_S) * \text{extent}(R_V)] + R_V$. Each input position mapped to display coordinates is then adjusted 510 by the accelerated displacement.

Figure 6:
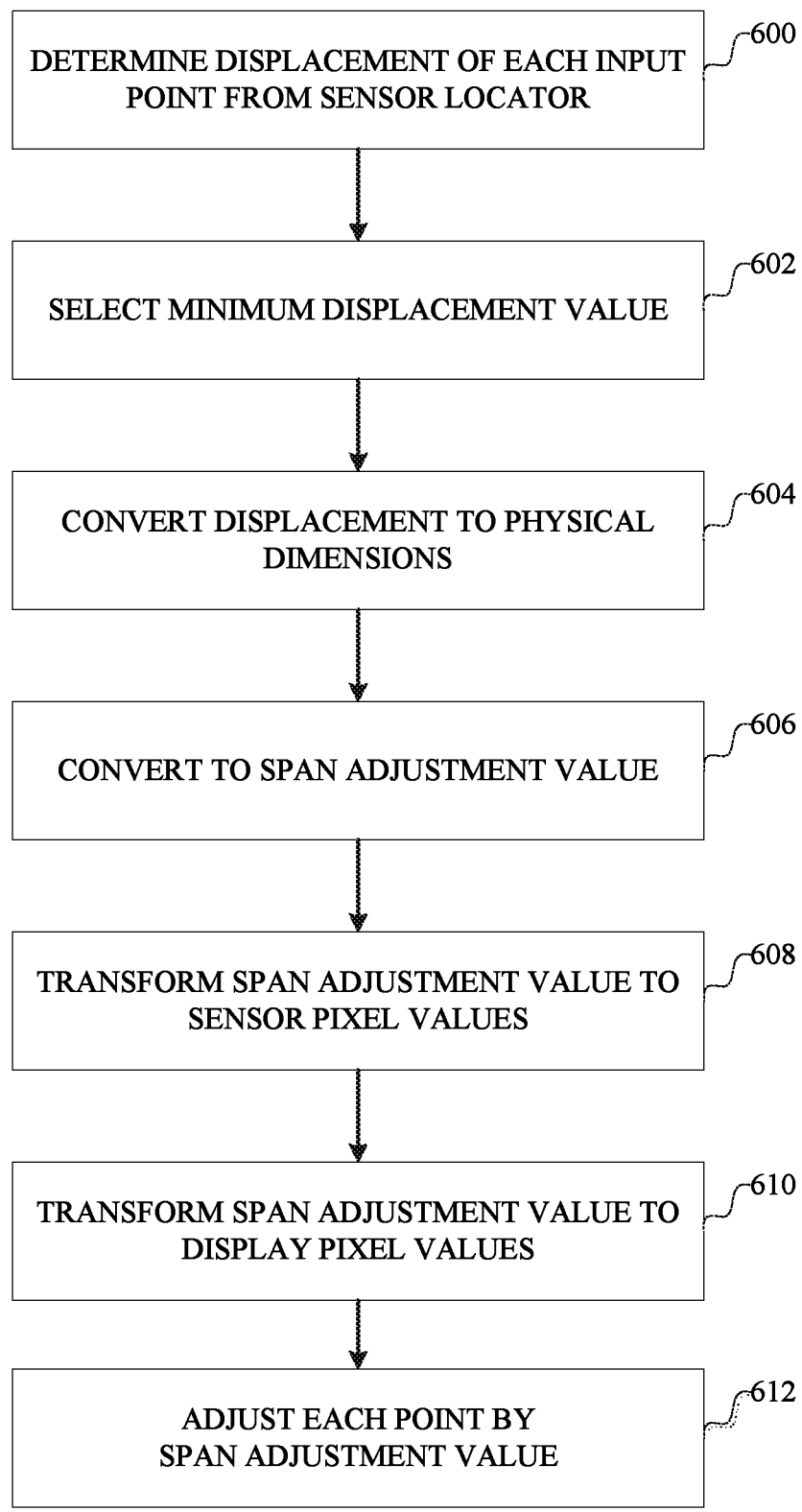
FIG. 6 is a flow chart illustrating an example implementation of span adjustment.

For absolutely mapped dimensions, a similar process called span adjustment can be used, as described in connection with FIG. 6. In FIG. 6, the displacement of each input from the sensor locator is determined 600, in pixels in the device coordinate space. The minimum displacement is selected 602. This minimum displacement value is converted 604 to physical dimensions using the pixel density of the device. The minimum displacement value in physical dimensions is transformed 606 to a span adjustment value, using any appropriate transform. A suitable transform may be similar to the acceleration transform, such as a piece-wise linear function that maps a displacement value to a span adjustment value. This span adjustment value is converted 608 back to pixel values. Similar to acceleration, the span adjustment value is then transformed 610 to display pixel values, and each input point is adjusted 612 using that value.

It should be noted that the acceleration and span adjustment modification to input points is done prior to applying the boundary conditions that ensure that points remain in the visible display area.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 7:
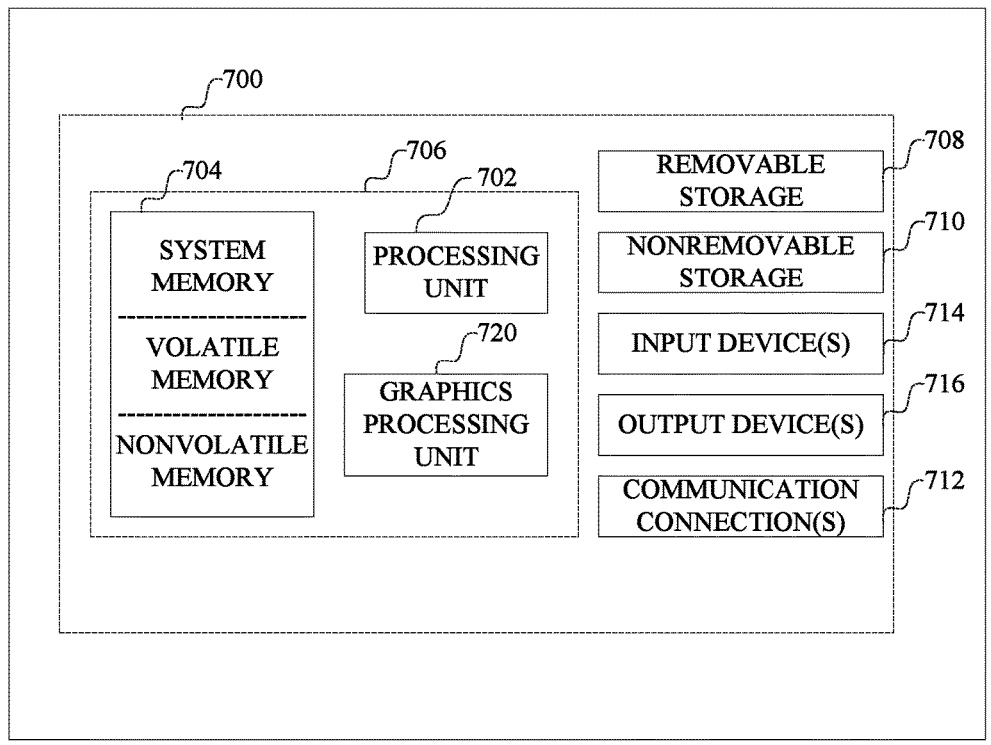
FIG. 7 is a block diagram of an example computing device in which such a system can be implemented.

FIG. 7 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 7, an example computing environment includes a computing machine, such as computing machine 700. In its most basic configuration, computing machine 700 typically includes at least one processing unit 702 and memory 704. The computing device may include multiple processing units and/or additional co-processing units such as graphics processing unit 720. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. Additionally, computing machine 700 may also have additional features/functionality. For example, computing machine 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer program instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 700. Any such computer storage media may be part of computing machine 700.

Computing machine 700 may also contain communications connection(s) 712 that allow the device to communicate with other devices. Communications connection(s) 712 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 700 may have various input device(s) 714 such as a keyboard, mouse, pen, camera, touch input device, and so on. Output device(s) 716 such as a display, speakers, a printer, and so on may also be included. All of these devices are well known in the art and need not be discussed at length here.

The system can be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

Figure 8:
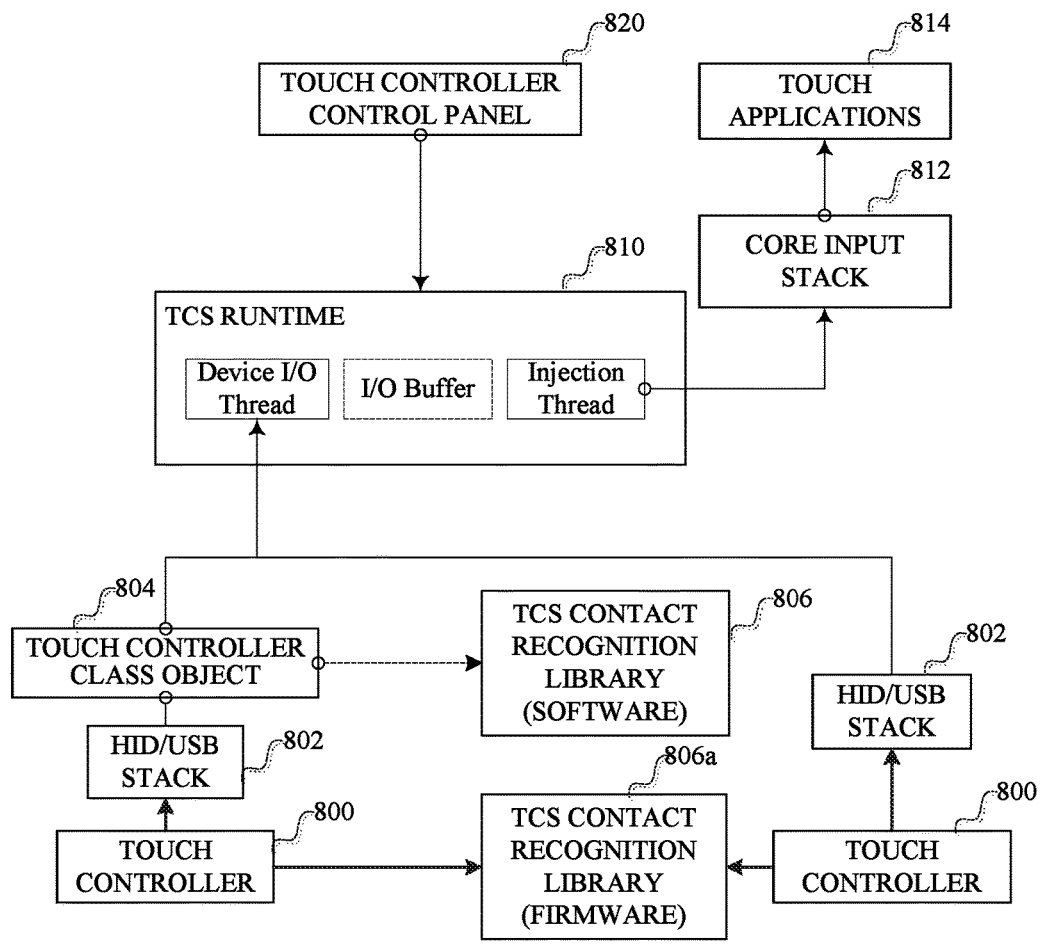
FIG. 8 is a block diagram of an example software architecture for use on such a computing device for implementing such a system.

A particular example software architecture will now be described in connection with FIG. 8. One or more indirect touch devices 800 can be connected to the computer platform through a USB/HID interface 802. Each of them has touch controller interface object 804 associated with it, which can be implemented as a dynamically linked library installed as a user-level service by the operating system. A contact recognition module 806 can be provided to provide for low level processing of sensor data from the input device to provide, for each frame, a list of contact and attributes of those contacts. This module could be a software library 806 or a firmware implemented library 806*a*.

The touch controller interface object 804 has the following methods. An open method allows the caller to open and initialize the device for data transfer following device attachment. A close method allows the caller to close the device, which involves clean up following physical removal. A query method retrieves device data. The device data is stored one or more data structures by the touch controller interface object. The device data can include information such as supported device modes, sensor dimensions and resolution, a maximum number of contacts, pressure entry/exit thresholds. A get method causes the object to transfer an array of stateless contact descriptors, state information (such as locked state status), and frame time information. A set method causes the object to enter into one of a set of modes. For example, this method can enable or disable hardware event reporting modes (e.g. HID mouse) during touch interactions, inform the device of interaction mode changes, or assign power state.

The touch controller interface for each connected device is accessed by a touch controller system (TCS) runtime module 810. Each device connection has a device input/output (i/o) thread 830 that binds touch controller devices to the system, queries and manages touch controller device capabilities, and assigns device modes and attributes of the device in accordance with host conditions and user configuration settings. An input/output (i/o) buffer thread 832 extracts touch data from the device. Each device connection also has an injection thread 834 that injects information from the touch devices to a core input stack 812 accessed by applications 814, to enable a consistent and quality end-user experience for touch controller devices. The TCS runtime module can be implemented as a dynamically linked library installed as a user-level service by the operating system, or can be a kernel-level implementation.

The runtime module performs the various functions for which an example implementation is described above, such as indirect-touch specific interactions, a user interaction model, state transitions based on z-information, mapping modes, acceleration/deceleration, span adjustment, normalization of data across devices, and power management. A control panel 810 is a user interface that allows various settings of the runtime module 810 to be manipulated by the users.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only. The terms "article of manufacture", "process", "machine" and "composition of matter" in the preambles of the appended claims are intended to limit the claims to subject matter deemed to fall within the scope of patentable subject matter defined by the use of these terms in 35 U.S.C. § 101.

What is claimed is:

1. A computer system comprising:
one or more processors and memory; and
at least one input for connection to a sensor to receive data describing multiple input points sensed by the sensor into the memory, the input points having locations in a sensor coordinate space;
a runtime module, comprising computer program instructions in the memory executed by the one or more processors to map the sensed input points into data describing multiple contacts having locations in a viewport in a display coordinate space for a display of the computer system, and to provide the data describing the multiple contacts to an input stack in the memory accessible by applications executed by the one or more processors,
wherein the runtime module further comprises settings including at least a mapping mode, wherein the mapping mode is selected from a group comprising an absolute mapping mode and a relative mapping mode,
wherein the runtime module maps the sensed input points from locations in sensor coordinate space into the contacts having locations in the display coordinate space based on at least the viewport and the selected mapping mode, wherein mapping the sensed input points into the contacts comprises:

determining displacement of each of the contacts with respect to other contacts, and
modifying the locations of the mapped contacts according to the determined displacement for a selected contact with a lowest magnitude displacement, by determining an offset according to the lowest magnitude displacement, and, for each contact, adding the offset to coordinates of the contact.

2. The computer system of claim 1, further comprising:
for each sensor, a touch controller module having an interface; and
wherein the runtime module accesses each touch controller module through the interface of the touch controller to access the data describing the multiple sensed input points from the sensor.

3. The computer system of claim 2, wherein the data describing the multiple sensed input points further comprises a list of contacts corresponding to the sensed input points and attributes for the contacts.

4. The computer system of claim 2, wherein the touch controller interface provides characteristics of the sensor.

5. The computer system of claim 4, wherein the characteristics include resolution of the sensor.

6. The computer system of claim 4, wherein the characteristics include dimensions of the sensor.

7. The computer system of claim 1, wherein the runtime module is further configured to apply acceleration, according to an acceleration function, to the contacts when mapping the sensed input points into the contacts.

8. The computer system of claim 7, wherein the runtime module includes a user interface enabling a user to manipulate a setting for the acceleration function.

9. The computer system of claim 1, wherein the runtime module is further configured to apply span adjustment, according to a span adjustment function, to the contacts when mapping the sensed input points into the contacts.

10. The computer system of claim 9, wherein the runtime module includes a user interface enabling a user to manipulate a setting for the span adjustment function.

11. The computer system of claim 1, wherein the display is a virtual display representing multiple monitors.

12. The computer system of claim 1, wherein the sensor comprises a multi-pointer indirect touch input device.

13. The computer system of claim 1, wherein the runtime module includes a user interface enabling a user to select the mapping mode from among at least the absolute mapping mode and the relative mapping mode.

14. A process performed by a computer comprising a processor, a memory, and an input for connection to a sensor, the process comprising:
receiving data through the input from the sensor into the memory, the data describing multiple sensed input points having locations in a sensor coordinate space;
accessing, by the processor, settings stored in the memory and including at least a mapping mode, wherein the mapping mode is selected from a group comprising an absolute mapping mode and a relative mapping mode;
mapping, by the processor, the sensed input points into data in the memory describing multiple contacts having locations in a viewport in a display coordinate space for a display of the computer based on at least the viewport and the mapping mode, wherein mapping the sensed input points into the contacts comprises:
determining displacement of each of the contacts with respect to other contacts, and
modifying the locations of the mapped contacts according to the determined displacement for a selected contact with a lowest magnitude displacement, by determining an offset according to the lowest magnitude displacement, and, for each contact, adding the offset to coordinates of the contact; and
providing, by the processor, the data describing the multiple contacts to an input stack in the memory accessible by applications executed by the processor.

15. The process of claim 14, wherein the sensor comprises a multi-pointer indirect touch input device.

16. The process of claim 14, wherein the computer comprises a runtime module, comprising computer program instructions in the memory and processed by the processor, to perform the mapping and to provide a user interface enabling a user to select the mapping mode from among at least the absolute mapping mode and the relative mapping mode.

17. The process of claim 14, wherein the data describing the multiple sensed input points further comprises a list of contacts corresponding to the sensed input points and attributes for the contacts.

18. A computer system comprising:
one or more processors and memory; and
at least one input for connection to a sensor to receive data describing multiple input points sensed by the sensor into the memory, the input points having locations in a sensor coordinate space;
a runtime module comprising computer program instructions stored in the memory and executed by the one or more processors to map the sensed input points into data describing multiple contacts having locations in a viewport in a display coordinate space for a display of the computer system, and to provide the data describing the multiple contacts to an input stack in the memory accessible by applications executed by the one or more processors,
wherein the runtime module further comprises settings including at least a boundary condition and a mapping mode, wherein the runtime module presents a user interface on a display enabling a user to select a mapping mode from a group comprising an absolute mapping mode and a relative mapping mode and to select a boundary condition from a group comprising a first boundary condition and a second boundary condition,
wherein the runtime module maps the sensed input points from locations in the sensor coordinate space into the contacts having locations in the display coordinate space based on at least the viewport, the selected mapping mode, and the selected boundary condition by:
mapping the locations for the sensed input points in the sensor coordinate space to coordinates of initial points in the display coordinate space using the selected mapping mode;
in response to the selected mapping mode being the relative mapping mode, determining whether one or more of the initial points are not within a visible area of the display according to the selected boundary condition;
in response to determining that the one or more of the initial points are not within the visible area of the display, computing an offset between coordinates of a bounding box including the initial points and coordinates of the viewport wherein the offset, when added to coordinates of the one or more initial points places one or more of the initial points in the visible area of the display according to the selected boundary condition; and adding the computer offset to the coordinates of the initial points to provide coordinates for the multiple contacts.

19. The computer system of claim 18, wherein the data describing the multiple sensed input points further comprises a list of contacts corresponding to the sensed input points and attributes for the contacts.

20. The computer system of claim 18, wherein the sensor comprises a multi-pointer indirect touch input device.

* * * * *